United States Patent
Saliba et al.

(10) Patent No.: US 9,481,553 B2
(45) Date of Patent: Nov. 1, 2016

(54) SYSTEM AND METHOD FOR CONTROLLING AT LEAST TWO AUTOMATED NON-PASSING RAIL MOUNTED GANTRY CRANES

(71) Applicant: ABB TECHNOLOGY AG, Zurich (CH)

(72) Inventors: Sleman Saliba, Heidelberg (DE); Bjoern Henrikson, Vaesteras (SE); Henrik Noren, Vaesteras (SE); Stefan Israelsson Tampe, Vaesteras (SE); Susanne Schmitt, Heidelberg (DE); Alessandro Zanarini, Baden (CH); Kerstin Muxfeldt, Kaiserslautern (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/772,419

(22) PCT Filed: Mar. 4, 2013

(86) PCT No.: PCT/EP2013/054281
§ 371 (c)(1),
(2) Date: Sep. 3, 2015

(87) PCT Pub. No.: WO2014/135191
PCT Pub. Date: Sep. 12, 2014

(65) Prior Publication Data
US 2016/0009531 A1 Jan. 14, 2016

(51) Int. Cl.
*B66C 13/48* (2006.01)
*G06Q 10/06* (2012.01)
(Continued)

(52) U.S. Cl.
CPC ............ *B66C 13/48* (2013.01); *B66C 19/002* (2013.01); *B66C 19/007* (2013.01); *G06Q 10/06312* (2013.01); *G06Q 10/08* (2013.01)

(58) Field of Classification Search
USPC .......................................... 701/19
See application file for complete search history.

(56) References Cited

U.S. PATENT DOCUMENTS

| 2006/0182527 A1 | 8/2006 | Ranstrom et al. |
| 2010/0021272 A1* | 1/2010 | Ward ................ B65G 63/004 414/137.1 |

FOREIGN PATENT DOCUMENTS

EP 2006237 B1 12/2008

OTHER PUBLICATIONS

Ri Choe et al: "Real-Time scheduling of twin stacking cranes in an automated container terminal using a genetic algorithm", Proceedings of the 27$^{th}$ Annual ACM Symposium on Applied Computing, SAC '12, Mar. 30, 2012, pp. 238-243, XP055085219.

(Continued)

*Primary Examiner* — Anne M Antonucci
(74) *Attorney, Agent, or Firm* — Leydig, Voit & Mayer, Ltd.

(57) ABSTRACT

A system or method, for controlling at least two automated non-passing rail mounted gantry cranes, has, for each crane, a crane control unit for ensuring execution of at least one work order received by the respective crane from an external scheduling system, and may have a rescheduling unit which performs a rescheduling of the at least one work order based on an expected trajectory along the rail determined for each work order. The rescheduling can be achieved by splitting at least one of the work orders into at least two new work orders and by re-sequencing and re-allocating resulting work orders to reduce the number or duration of situations, where the expected trajectory of one crane blocks the expected trajectory of another crane and/or to reduce a workload imbalance between the cranes. The rescheduling unit operates in parallel with the crane control units, and dynamically updates these original work orders.

20 Claims, 5 Drawing Sheets

(51) Int. Cl.
*B66C 19/00* (2006.01)
*G06Q 10/08* (2012.01)

(56) References Cited

OTHER PUBLICATIONS

Taejin Park et al: "Real-time scheduling for twin RMGs in an automated container yard", or Spectrum; Quantitative Approaches in Management, Springer, Berlin, DE, vol. 32, No. 3, Apr. 4, 2010, pp. 593-615, XP019843679.

Uno Bryfors et al: "Cranes with brains: Euromax—The modern automatic container terminal", ABB Review, Sep. 30, 2006, pp. 56-59, XP055085220.

Robert Stahlbock et al: "Operations research at container terminals: a literature update", or Spectrum; Quantative Approaches in Management, Springer, Berlin, DE, vol. 30, No. 1, Oct. 10, 2007, pp. 1-52, XP019561596.

Christian Bierwirth et al: "A fast heuristic for quay crane scheduling with interference constraints", Journal of Scheduling, Kluwer Academic Publishers, BO, vol. 12, No. 4, Feb. 24, 2009, pp. 345-360, XP019682291.

* cited by examiner

SYSTEM AND METHOD FOR CONTROLLING AT LEAST TWO AUTOMATED NON-PASSING RAIL MOUNTED GANTRY CRANES

CROSS-REFERENCE TO RELATED APPLICATIONS

This application is a U.S. national stage application under 35 U.S.C. §371 of International Application No. PCT/EP2013/054281, filed on Mar. 4, 2013. The International Application was published in English on Sep. 12, 2014, as WO 2014/135191 A1 under PCT Article 21(2).

FIELD

The invention relates to a system and method for controlling at least two automated rail mounted gantry cranes which cannot pass one another.

BACKGROUND

A large part of traded goods in the world is transported over sea by container ships. The ever increasing amount of international trade results in higher demands of container terminals all over the world to process, i.e. to import, store, and/or export, more goods with an increased speed.

Container terminals, e.g. in marine ports, have the need to store containers for a time period ranging from hours to weeks. In general terms, a container yard is a container storage area in which the containers are stored in a 3 dimensional way by placing some of them on the ground beside one forming a rectangular shape and by stacking the other containers on top of those on the ground. One or more gantry cranes are used to drop-off the containers in the yard, to move the containers between locations inside the yard and to pick them up again from the yard. Different types of gantry cranes are known, in particular rubber-tired gantry (RTG) cranes and rail-mounted gantry (RMG) cranes. The invention deals with RMG cranes, where the cranes move on rails, and where the container yard is situated in between two or more of these rails so that the RMG cranes span across the yard. RMG cranes are often operating in an automated way, in which case they are also called automated stacking crane (ASC). In a container yard, each ASC may either have its own pair of rails, or the ASCs may be mounted on the same rail. In the latter case, the ASCs are not able to pass each other which in the following is denoted as non-passing cranes. In the case of two non-passing cranes, these cranes are also called twin stacking cranes or twin RMG.

In the article "Cranes with brains" by Bryfors et al, published in ABB Review March 2006, automation of a container terminal is described, where the container storage area is divided into blocks and each block is equipped with two ASCs, called automatic rail-mounted gantry cranes (ARMG). In order to control the movement of the ARMGs, each of them is equipped with a crane control system which integrates sensor information delivered from systems for target and obstacle position measurement as well as for load position measurement. Based on this information, the crane control system finds the optimal transport path within the yard, takes care of collision avoidance and keeps pendulum movements of the load as low as possible, by providing appropriate control information to underlying position and motion controllers which generate actuating signals for the drives and electric motors of the crane.

The information on which container is to be moved by which crane from which start to which end position is generated by a so-called terminal operating system (TOS). The TOS takes as input the container handling jobs required in order to unload and load the ships. Further, it considers the container handling jobs for loading and unloading the trucks or trains on the landside of the container yard. Even further, it considers the case that a target container of a job is placed beneath some other container. Then, a corresponding work-order is generated by the TOS for relocating the upper container at a nearby stack. These relocation work-orders may be called rehandling jobs.

Each ASC in the container yard receives its work orders one by one from the TOS. In case of non-passing ASCs, the work orders are executed using a first-come-first-served strategy, which means that the ASC which receives its work order first has higher priority. Accordingly, if the ASCs have colliding work orders in the sense that one ASCs work order overlaps the other ASCs position, the ASC with lower priority has to yield and wait in order to avoid collisions. These situations are in the following called interference. In order to determine which crane actually has priority and whether an interference is likely to occur or not, the crane control systems of the ASCs may exchange corresponding information.

From US 2006/0182527 A1, a method for automated container terminal scheduling is known, where it is suggested to reorganize the containers in the terminal when resources, i.e. cranes, are available to perform the corresponding tasks. The aim of the reorganization is to better adapt the locations of the containers within the terminals to external changes, such as changes in ship and/or truck arrivals, custom holds on containers or port equipment failures. Accordingly, US 2006/0182527 A1 describes a terminal operating system generating updated schedules for the various cranes and other equipment in the container terminal.

In EP 2 006 237 B1, a crane control system is disclosed for a crane that moves containers in a specific block of a container terminal. It is proposed that the crane control system takes care of the container storage optimization in its corresponding block. The tasks taken care of by the crane control system are to find an optimal placement for new containers whether delivered by land or by sea, to remove a container from the block in the shortest possible time and to relocate containers to more favorable positions during times of low crane load. Accordingly, the crane control system takes over a part of the scheduling functionality from the TOS, which in EP 2 006 237 B1 is called port logistics system.

In both documents, US 2006/0182527 A1 and EP 2 006 237 B1, the problem of non-passing ASCs is not addressed.

In the paper "Real-time scheduling of twin stacking cranes in an automated container terminal using a genetic algorithm," by R. Choe et al, SAC '12 Proceedings of the 27th Annual ACM Symposium on Applied Computing, New York, N.Y., USA, pp. 238-243, ISBN: 978-1-4503-0857-1, the problem of scheduling twin automated ASCs is addressed. A scheduling system first identifies so called main jobs to be done at the container terminal, where the main jobs are the seaside jobs for discharging and loading the ships as well as the landside jobs for carrying in and carrying out containers from and to external trucks.

Then, the scheduling system described in Choe et al generates so called preparatory jobs, which are jobs identified to possibly, but not necessarily, assist the main jobs. The preparatory jobs are in particular rehandling jobs, as explained above, and repositioning jobs. A repositioning job is a job by which a container is moved to another position closer to its final target location. Due to the repositioning jobs, the delay caused by interference between the ASCs can be reduced, as one of the ASCs can be made to temporarily put down the container at a location outside the range of interference and to perform other jobs until the other ASC moves away.

After the generation of the preparatory jobs, the actual crane scheduling is performed in order to determine which of the jobs is to be performed in which sequence by which of the twin ASCs. For the crane scheduling, the assignment of ASCs is defined to be only required for the preparatory jobs, as in the set-up discussed in Choe et al the seaside jobs can only be performed by the seaside ASC and the landside jobs can only be performed by the landside ASC. Further, the main jobs and the preparatory jobs are treated as independent jobs. If scheduling of the preparatory jobs results in an inappropriate job order, like a repositioning job following its corresponding main job or the originally blocked container now lying on top of its stack, the respective preparatory job becomes obsolete.

Accordingly, Choe et al describes a scheduling system which expands the known functionality of a TOS by introducing repositioning jobs in order to reduce interference between non-passing ASCs. The scheduled main and preparatory jobs will afterwards be transmitted to the respectively assigned ASC and its corresponding crane control system for job execution.

In order to implement this proposed solution in an existing TOS, all the algorithms for job-handling already present would have to be replaced since the proposed scheduling represents a holistic approach. Accordingly, a considerable effort would be required for the actual testing and commissioning of the changed system. In addition, a complete change of a running system always leads to an increased risk for technical problems and system failures, at least in the beginning after the change has been affected.

SUMMARY

An aspect of the invention provides a system for controlling at least two automated rail mounted gantry cranes which cannot pass one another, the system comprising, for each of the cranes, a crane control unit including a control input interface, configured to receive, from a scheduling system, at least one work order at a time, and configured to receive at least one sensor information reflecting execution of one of the work orders by the respective crane, wherein each work order specifies at least a start position and an end position of a target container to be moved by a respective crane; a control processing unit configured to process the at least one work order and the at least one sensor information to generate control information for ensuring execution of the at least one work order by the respective crane; a control output interface configured to transmit the control information towards at least one actuator of the respective crane; and a rescheduling unit including (i) an input interface configured to receive the at least one work order for all the cranes; (ii) a data processing module configured to perform a rescheduling by generating for each work order an expected trajectory along the rail between corresponding start and end positions, splitting at least one of the work orders into at least two new work orders through introduction of at least one intermediate position between the start and end positions, and determining a sequence and an allocation to the cranes for the resulting new and unsplit work orders so as to reduce at least one of: (a) a number of situations, where an expected trajectory of one crane blocks the expected trajectory of another crane, (b) a duration of situations, where the expected trajectory of one crane blocks the expected trajectory of another crane, and (c) a workload imbalance between the cranes; and (iv) an output interface configured to transmit new and unsplit work orders to the at least one control input interface of the crane control unit of the respective allocated crane, wherein the rescheduling unit operates in parallel with the crane control units executing the work orders, and wherein the control processing units regard the work orders received from the rescheduling unit as update of all previously received work orders.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention provides a system and a method for controlling at least two non-passing automated rail mounted gantry cranes with which the throughput of a container yard can be increased without requiring a substantive change in the existing container terminal system.

An aspect of the invention provides a system and method for controlling at least two automated rail mounted gantry cranes which cannot pass one another, the system comprising for each of the cranes a crane control unit containing at least one control input interface for receiving from a scheduling system at least one work order at a time and for receiving at least one sensor information reflecting execution of the at least one work order by the respective crane, wherein each work order specifies at least a start position and an end position of a target container to be moved by the respective crane. The crane control units each further comprise a control processing unit for processing the at least one work order and the at least one sensor information to generate control information for ensuring execution of the at least one work order by the respective crane, and at least one control output interface for transmitting the control information towards at least one actuator of the respective crane.

In the system for controlling at least two non-passing automated rail mounted gantry cranes as described in the introduction, a rescheduling unit is introduced which contains at least one input interface for receiving the at least one work order for all the cranes, a data processing module adapted to perform a rescheduling by generating for each work order an expected trajectory along the rail between the corresponding start and end positions, splitting at least one of the work orders into at least two new work orders through introduction of at least one intermediate position between the start and end position, and determining a sequence and an allocation to the cranes for the resulting new and unsplit work orders so as to reduce at least one of the following rescheduling criteria:

a number of situations, where the expected trajectory of one crane blocks the expected trajectory of another crane, a duration of situations, where the expected trajectory of one crane blocks the expected trajectory of another crane, a workload imbalance between the cranes, at least one output interface for transmitting the new and unsplit work orders to the at least one control input interface of the crane control unit of the respective allocated crane.

The rescheduling unit operates in parallel with the crane control units currently executing the work orders, and the control processing units of these crane control units regard the work orders received from the rescheduling unit as update of all previously received work orders.

Accordingly, the present invention which is to be applied in the case of ASCs on the same rail, such as twin RMGs, suggests keeping the known TOS and crane control functionality of a container terminal untouched. This means that the TOS continues to create prehandling jobs and to schedule work orders for each of the ASCs in order to fulfill the above described main jobs as well as the prehandling jobs. The TOS further continues to transmit the work orders one by one to the correspondingly allocated crane. Alternatively, it may transmit them as a list of several future work orders to the correspondingly allocated crane. The crane control is continued to be performed by a crane control unit individually assigned to each ASC, where the crane control units receive the work orders from the TOS and control execution of these work orders.

The basic idea of the invention is to introduce a rescheduling functionality for the scheduled work orders in between TOS and crane control, where the rescheduling unit checks whether a possible splitting of work orders would result in an improved work order schedule, and where the rescheduling is performed in parallel with the crane control, i.e. dynamically and at the same time as execution of work orders has started, so that the additional rescheduling does not cause any time delay.

The rescheduling and possible splitting is performed based on an expected trajectory, i.e. a time-dependent path, generated by the data processing module of the rescheduling unit for each of the work orders, where the trajectory leads from the corresponding start to the end container position given by the respective work order.

The rescheduling unit may be either a stand-alone data processing device with its own input and output data communication hardware, or a subunit added to or integrated in one of the crane control units or the TOS or another already existing data processing device of the container terminal. As a subunit, it may be provided either—at least in part—with its own pieces of hardware or just in the form of software modules to be added to or integrated in the existing software modules and sharing the hardware modules already present.

Accordingly, the control processing unit of one of the crane control units and the data processing module of the rescheduling unit may be one and the same piece of hardware. Also, the control input interface and the input interface of the rescheduling unit as well as the control output interface and the output interface of the rescheduling unit may share the same hardware, at least in part.

Due to the invention, a fast and simple upgrading of an existing container terminal to a solution providing job splitting for non-passing ASCs is facilitated, as only additional hardware and/or software components are introduced and as the inner functions of the existing parts of the container terminal automation system, in particular TOS and crane control, may remain unamended. Since the additional hardware and/or software components work in parallel with the crane control units, they do not hinder or slow down the execution of the original work orders provided by the TOS and, for testing purposes or in the case of malfunctioning, they can easily be disabled without disturbing the execution of the original work orders.

The job splitting as such reduces at least one of yielding operations and waiting times for the cranes and/or better balances the work load between the cranes. Thus, the total traveling time and travel distance of the cranes along the rails are reduced, which potentially results in a more energy efficient operation, in an improved collaboration between the cranes and finally in an increased container throughput per container yard or block, where a high container throughput is the main objective of container terminals since it reduces the berthing times for ships in the harbor.

In an embodiment, the data processing module of the rescheduling unit determines the intermediate position of a split work order so that the intermediate position fulfills at least one of the following position criteria:

It is located at an empty position, for example found in a map of possible container positions delivered by one of the crane control units, which has the shortest distance to the expected trajectory of the work order to be split compared to the other empty positions.

It is located at an empty position which has the best accessibility from the expected trajectory of the work order to be split. In this way, for example higher-level positions could be preferred as they have reduced container drop-off and pickup times.

It is located at an empty position which does not block any target container to be moved next, where the phrase "to be moved next" can be predefined to mean for example "to be moved within a certain number of following work orders" or "to be moved within a certain future time horizon".

In a further embodiment, the data processing module further takes into account an earliest start time and/or a latest completion time of at least one of the work orders or of a subtask of at least one of the work orders. This information may be provided by the TOS as well, in order to ensure timely execution of the work orders. A subtask may for example be the picking-up or setting-down of a container in one of the transfer zones, which has to be performed by a specified time or cannot be performed earlier than a specified time.

Even further, the data processing module may perform the rescheduling iteratively, until for example a predefined threshold of one of the rescheduling criteria is exceeded.

Apart from that, the data processing module may perform the rescheduling once for a newly received list of work orders or whenever receiving an external trigger, where the trigger may come from at least one of the crane control units or from an external server. The list of work orders may contain either just the single next work orders for each of the at least two RMG cranes, e.g. two or three work orders in total, or several work orders per crane. The trigger may for example be generated when external conditions for execution of the work orders have changed, resulting in an adoption of the rescheduling criteria, such as an unexpected malfunction in one of the non-passing ASCs which would require the other ASCs on the same rail to take over at least some of its jobs so that a workload imbalance between the ASCs would even be desirable.

During rescheduling, the data processing module may further take into account at least one of the following additional information on ongoing and/or future work order execution, which may preferably be delivered by one or several of the crane control units or alternatively by a supervision system:
  current position of the target container of the respective work order,
  current operational status of the crane assigned to the work order under rescheduling,
  status and/or timing of work order execution currently performed by the crane which is assigned to the work order under rescheduling, and
  timing of execution of future work orders.

A close cooperation and exchange of information between the crane control units and the rescheduling unit may be advantageous as the above listed information may help the rescheduling unit to improve the accuracy and applicability of the determined expected trajectories. As a result, the re-scheduled work orders are better adapted to any particularities occurring during current work order execution or expected for execution of future work orders.

In a special embodiment, the data processing module may determine from an expected trajectory a corresponding length of interference time during which the crane assigned to the corresponding work order has to yield and/or wait. This information may then be used for different purposes as explained below.

In another special embodiment, the data processing module may determine from an expected trajectory a workload imbalance between the cranes by calculating and comparing the number of work orders performed by each of the cranes during a predefined period of time and/or by calculating and comparing the length of idle time for each of the cranes during the predefined period of time.

The decision on whether a work order needs to be split or not, may then be made by the data processing module depending on whether the length of interference time and/or whether the workload imbalance exceeds a corresponding predetermined threshold.

The data processing module may on the one hand perform the rescheduling stepwise based on heuristic rules, where for each of the steps—generation of expected trajectories, splitting of work orders, determination of a sequence and an allocation to the cranes for the resulting new and unsplit work orders—separately adapted rules are defined, taking into account the various criteria described above as well as the length of interference time and/or the workload imbalance.

On the other hand, the data processing module may perform the rescheduling by applying a scheduling algorithm which directly sequences and allocates the work orders to the at least two cranes taking the at least one work order for all the cranes as input. The scheduling algorithm may in particular
  allow for splitting of the at least one work order by employing preemption, which is known from classical machine scheduling theory;
  abide to at least one of the following restrictions:
    no splitting of work orders the duration of which or the corresponding expected trajectory of which falls below a corresponding predefined threshold,
    no splitting of work orders which are above a predefined priority level,
    no violating of a predefined precedence of work orders,
    no or minimum violating of a predefined earliest start time and/or a latest completion time of the at least one work order or of a subtask of the at least one of the work orders, and
  optimize the resulting sequence and allocation of the work orders according to at least one of the following objectives:
    minimizing an overall execution time of the at least one work order, in particular the overall execution time, also called makespan, of multiple preselected work orders, where multiple preselected work orders may be regarded per crane, per container yard or per another predefined group of cranes,
    minimizing a travelling distance for those cranes which are in an unloaded state,
    minimizing a length of interference time between the cranes,
    minimizing a workload imbalance between the cranes,
    minimizing a waiting time for other container handling equipment waiting for work order completion by the cranes,
    keeping a time difference between a latest completion time and an expected completion time of the at least one work order above zero, and
    minimizing an amount of energy used by the cranes.

Regarding preemption, classical machine scheduling theory allows for a scheduler or scheduling algorithm to interrupt the processing of a work order, also called job, at any point in time and to put a different job on the machine, here a crane, instead. The amount of processing or work order execution which the preempted job has received already is not lost. When the preempted job is afterwards put back on the machine, or another parallel working machine, it requires from this machine the remaining processing time. In contrast to classical preemption, the scheduling algorithm has to take into account that further to the originally planned work order execution time, each splitting of work orders on a container terminal introduces an additional amount of time for the extra drop-off and pickup operations.

The different optimization objectives may be combined by the data processing module by taking into account a priority and/or a weight predefined for at least one of the objectives to be combined.

In a final step, it may be provided that the result for one or a multiple of the above described optimization objectives or the combination of optimization objectives is compared with the same indicator determined for the work orders scheduled by the TOS, and the splitting of work orders is ultimately allowed for only if the indicator for the un-split work orders is less advantageous. In other words, it is established that the expected overall execution time or travelling distance or length of interference time or workload imbalance etc. is indeed reduced by the planned split work orders before sending them to the crane control units.

The method for controlling at least two automated rail mounted gantry cranes which cannot pass one another and its embodiments are defined by the above described steps performed by the elements and units contained in the above-described system.

Figure 1:
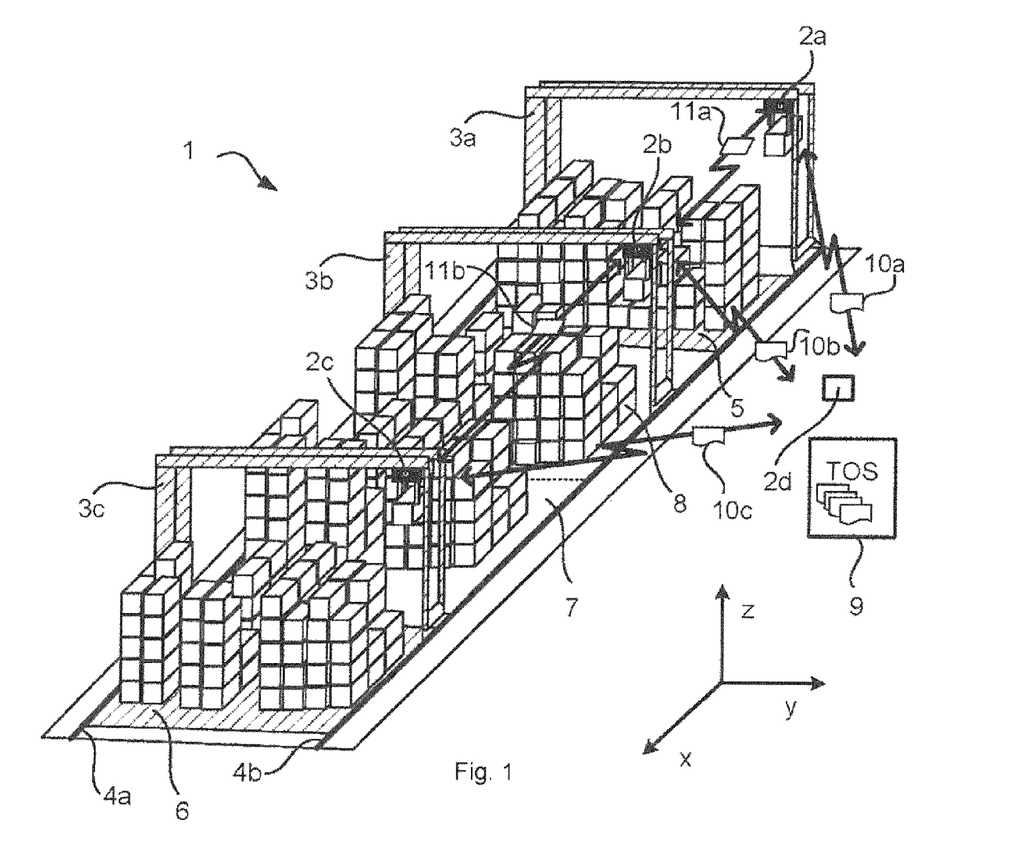
FIG. 1 shows a container yard with non-passing automated RMGs.

In FIG. 1, a diagram is shown illustrating a container yard 1 of a container terminal containing a considerable number of stacked containers 8. Usually, a container terminal may contain several of such container yards. The container yard 1 comprises three automated stacking cranes 3a, 3b, 3c. The ASCs 3a, 3b 3c are arranged on a pair of rails 4a, 4b so that they can move between a first transfer zone 5 and a second transfer zone 6, travelling past a main container storage area located in the middle between the first and second transfer zones. Since the ASCs use one and the same pair of rails 4a, 4b, they cannot pass each other. A more common arrangement in container yards is the usage of two non-passing ASCs, also called twin RMGs.

A transfer zone is an area belonging to a container yard and being situated at one of its outer ends. In such a transfer zone, containers may be temporarily dropped-off by the ASCs 3a, 3b, 3c in order to be picked-up shortly afterwards by external container terminal equipment to be loaded onto ships on the sea side or onto truck or trains on the land side of container yard 1a. As can be seen in FIG. 1, the transfer zones 5 and 6 are each located at one of the short ends of the rectangular container yard 1, where the seaside and the landside loading zones are situated directly behind. Accordingly, each container 8 will enter and leave the container yard 1 through one of its short ends. Such an arrangement may be called end-loaded container yard.

An intermediate zone 7 is located in the midst of the containers of the main storage area of container yard 1, dividing the main storage area into two so called blocks. A plurality of containers 8 are placed in each transfer zone 5, 6 as well as in each of the two blocks adjacent to intermediate zone 7 in a three-dimensional way, i.e. the containers do not only cover the ground of container yard 1, but are stacked on top of each other as well.

The ASCs 3a, 3b, 3c are arranged to move the containers 8 between the transfer zones 5, 6, as well as between one transfer zone, 5 or 6, and the main storage area. The movement of the ASCs 3a, 3b, 3c along the pair of rails 4a, 4b, as well as the movement of their corresponding end effectors used to pick-up, hold and drop-off one of the containers 8 are controlled for each of the ASCs by a corresponding crane control unit 2a, 2b, 2c. Accordingly, the crane control units 2a, 2b, 2c each generate control signals for the actuating units of the respective ASCs, in particular electric motors, so that the actuating units may cause the required movements of the ASC to execute its assigned work orders. In order to know which container to be moved next, the ASCs 3a, 3b, 3c are arranged to acquire work orders 10a, 10b, 10c. The work orders 10a, 10b, 10c are generated and transmitted from a terminal operating system (TOS) 9.

As illustrated in FIG. 1, the ASCs 3a, 3b, 3c have more or less the same working range within the yard. The difference in the working ranges is defined by the two transfer zones 5, 6, where there are always positions in each of the transfer zones that can only be reached by one of the ASCs due to the fact that the ASC are non-passing, even if in some larger transfer zone layouts partial access of two or all ASCs 3a, 3b, 3c may be allowed.

Traditionally, the ASC work orders 10a, 10b, 10c are created and scheduled by the TOS 9, and the ASCs 3a, 3b, 3c receive the work orders 10a, 10b, 10c respectively assigned to them one by one. The work orders are then executed by the ASCs 3a, 3b, 3c using a first-come-first-served strategy, meaning that in case of interfering work orders, the ASC which received its work order first has highest priority while the other ASCs have to yield and/or wait accordingly.

The embodiments disclosed herein relate to scheduling work orders between at least two of the ASCs 3a, 3b, 3c. In more detail, some embodiments concern a strategy for improving the efficiency of the ASCs 3a, 3b, 3c by introducing a rescheduling functionality. The disclosed embodiments can be implemented by simply adding software to one of the already existing crane control units 2a, 2b or 2c. Alternatively, an additional rescheduling device or rescheduling unit may be introduced.

The interaction between TOS, crane control units and corresponding ASCs will now be explained with reference to FIGS. 2 and 3.

Figure 2:
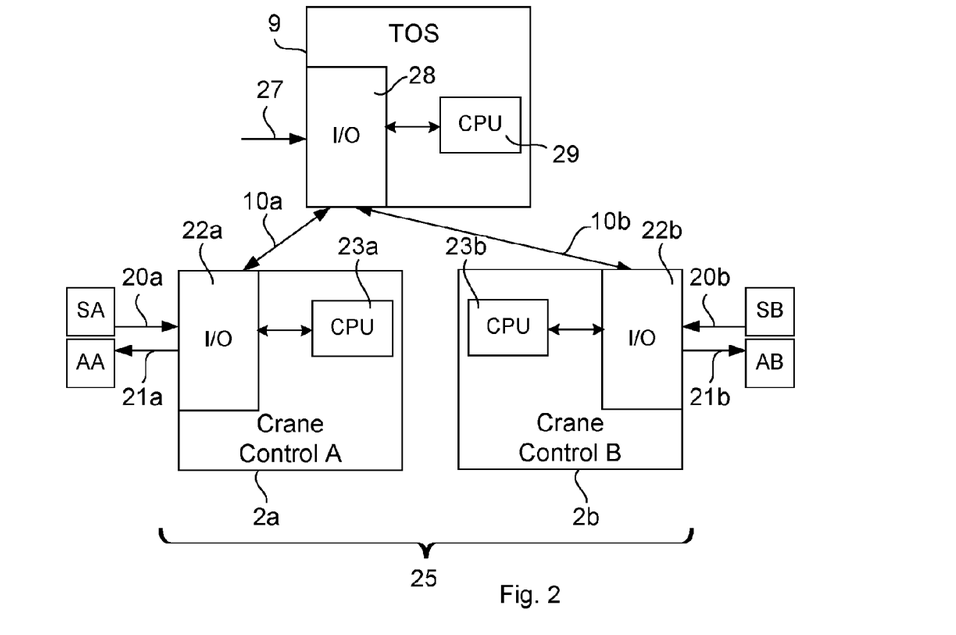
FIG. 2 shows a known setup for generating work orders and for controlling of non-passing twin RMGs.

In FIG. 2, a system 25 for controlling the two ASCs 3a and 3b is seen together with TOS 9. The system as well as its arrangement together with the TOS 9 is known from the art. The system 25 comprises the two crane control units 2a, 2b belonging to the ASCs 3a and 3b, respectively. Each crane control unit 2a, 2b contains an interface unit 22a, 22b which is a combination of a control input interface and a control output interface. The control input interfaces are each arranged for receiving from TOS 9 one work order 10a, 10b at a time, where the one work order 10a, 10b is the next work order to be executed by the respective crane 3a or 3b and where the one work order 10a, 10b specifies a start position and an end position of a target container 8 to be moved by the respective crane within container yard 1.

The control input interface of the interface units 22a, 22b is further arranged for receiving a sensor information 20a, 20b from a sensor SA, SB, where the sensor information 20a, 20b reflects execution of a current work order. Sensor information 20a, 20b may for example be a position information of the respective crane with respect to the pair of rails 4a, 4b, or a position and/or size information of the container 8 which is to be moved next, or an information on obstacles within the path to be taken by the crane.

The crane control units 2a, 2b further contain a control processing unit 23a, 23b for processing the one work order 10a, 10b and the at least one sensor information 20a, 20b to generate control information 21a, 21b for ensuring execution of the one work order 10a, 10b by the respective ASC 3a, 3b. The control information 21a, 21b may for example be a reference value for an underlying controller which controls one or several of the actuators AA, AB of the respective ASC, in particular electric drives and/or motors. If no underlying controller is present, the control information 21a, 21b may as well be at least one actuating signal which can be applied directly to the actuators AA, AB.

The control output interface of the interface units 22a, 22b is arranged for transmitting the control information 21a, 21b towards the at least one actuator AA, AB, either via the underlying controller or directly, as is shown here.

The TOS 9 is also equipped with a combined input/output interface 28 for communication with the crane control units 2a, 2b and for reception of an input signal 27 from an external source, such as a human or machine based supervisor or container terminal operator. It further comprises a data processing unit 29 which is arranged to generate the work orders 10a, 10b for the ASCs 3a, 3b and to schedule them, where the work orders are generated by processing loading and unloading plans for ships, trucks and/or trains, by choosing locations for incoming containers 8 in container yard 1 and by creating prehandling jobs if necessary and appropriate.

Figure 3:
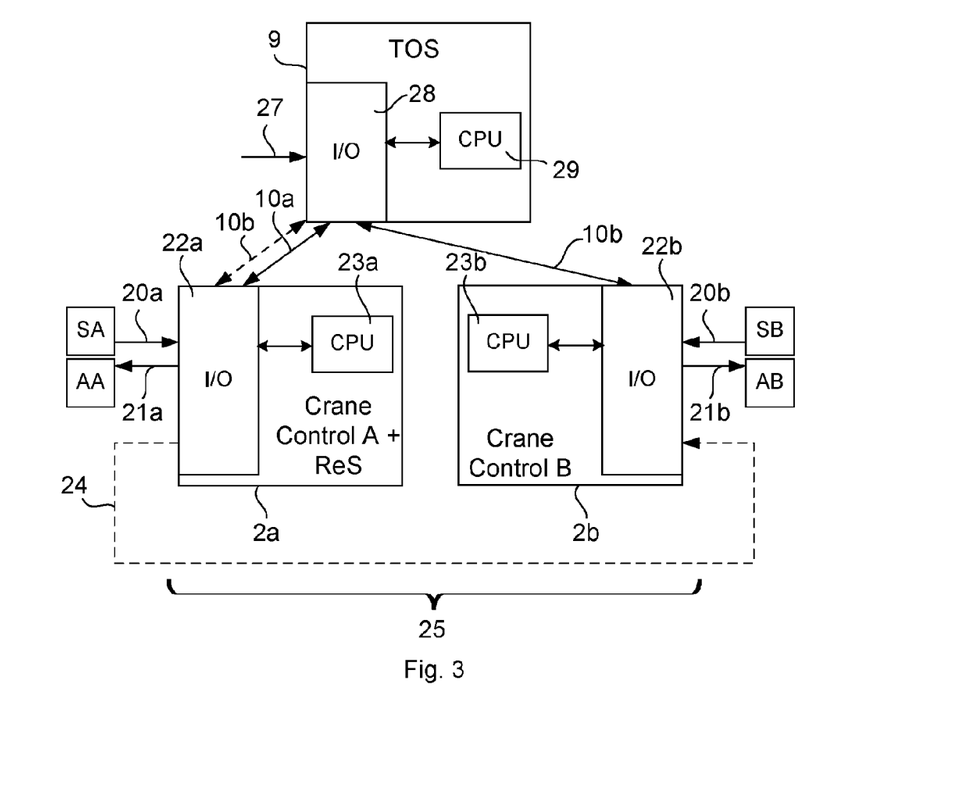
FIG. 3 shows a setup for generating work orders and for controlling of non-passing twin RMGs according to an embodiment of the invention.

FIG. 3 shows the system 25 with extended functionality according to the present invention. A rescheduling unit ReS is integrated into one of the already existing data processing devices belonging to container yard 1, here crane control unit 2a. The rescheduling unit ReS uses the existing hardware components of crane control unit 2a, which means that the components of the rescheduling unit ReS are all realized as software modules. In an alternative solution, the rescheduling unit ReS may as well be implemented as an additional hardware device or as a mixture of additional hardware modules and software modules.

Rescheduling unit ReS contains an input interface integrated in interface unit 22a for receiving the same work orders as all the ASCs, i.e. in this example work orders 10a and 10b or list of work orders 10a, 10b. In FIG. 3, the differences to the known system of FIG. 2 are indicated by using dotted lines.

The rescheduling unit ReS further contains a data processing module integrated in control processing unit 23a adapted to perform a rescheduling of the received work orders 10a, 10b, thereby generating new work orders as will be explained below with respect to FIGS. 4a to 6b.

Even further, rescheduling unit ReS contains an output interface integrated in interface unit 22a for transmitting the rescheduled work orders 24, containing the new work orders as well as unsplit work orders, to the crane control unit 2a or 2b of the respectively allocated crane. In the example of FIG. 3, the transmission to crane control unit 2a takes of course place internally from the software module for rescheduling to the software module for work order execution. However, the transmission of rescheduled work orders 24 to the other crane control unit 22b requires an additional communication connection compared to system 25 of FIG. 2.

Rescheduling unit ReS operates in parallel with the crane control units 2a, 2b, i.e. while the crane control units 2a, 2b are starting to execute the newly received work orders 10a, 10b, rescheduling unit ReS reschedules them, thereby potentially introducing an additional drop-off and pickup action some time later during the same work orders. Once the crane control units 2a, 2b have received the rescheduled work orders, they regard them as an update of all previously received work orders. Accordingly, it may occur that a crane control unit starts with one work order, but after receiving the update, interrupts it and continues with another work order.

The operation of the data processing module of rescheduling unit ReS is now illustrated with the help of FIGS. 4a to 6b. The FIGS. 4a, 5a and 6a relate to scheduled work orders generated by TOS 9, and the FIGS. 4b, 5b, and 6b relate to rescheduled work orders generated by rescheduling unit ReS.

The data processing module of rescheduling unit ReS first generates for each of the received work orders 10a, 10b an expected trajectory along the pair of rails 4a, 4b between the start and end positions of the respective work order. The trajectories are shown in FIGS. 4a to 6b as continuous lines for ASC 3a and as dotted lines for ASC 3b. The start position of each work order is indicated by a square and the end position by a circle, where the squares and circles belonging to ASC 3a have a continuous contour and the squares and circles belonging to ASC 3b have a dotted contour. In the examples described by FIGS. 4a to 6b, the start and end positions of the containers are illustrated in longitudinal dimension x only, along the pair of rails 4a, 4b. At each of the longitudinal positions x, several containers may be placed in a row in y-direction (see FIG. 1). In addition, some of the containers may be stacked on top of other containers in z-direction. Accordingly, a lateral dimension y and a vertical dimension z is further to be taken into account during the actual picking-up and dropping-off actions performed by the ASCs. Therefore, the work orders 10a, 10b received from TOS 9 indicate the start and end positions as [x, y, z]-triplets containing the longitudinal component x as well as the corresponding lateral and vertical components, y and z.

Figure 4A:
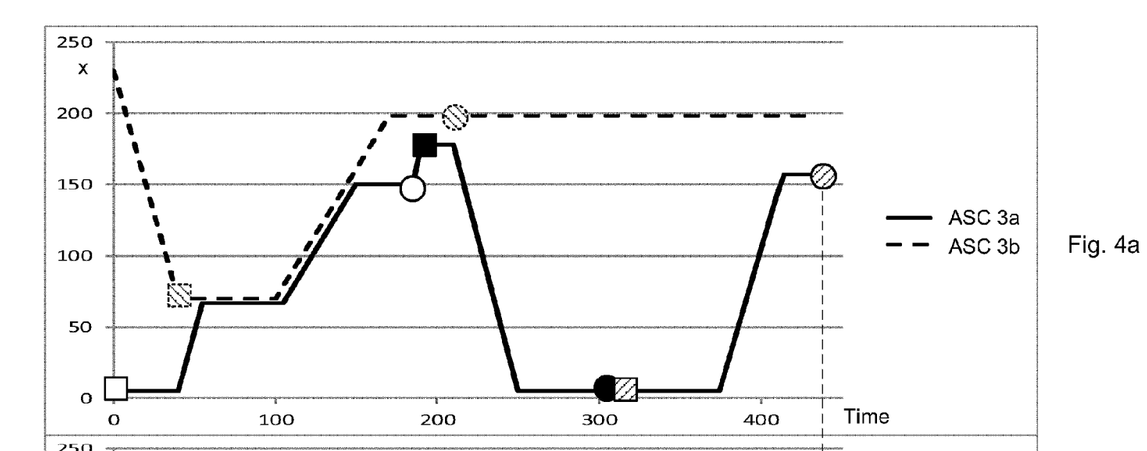
FIGS. 4a, 4b show trajectories of scheduled and rescheduled work orders applying heuristics.

In FIG. 4a, a list of three work orders for ASC 3a and just one work order for ASC 3b was received by rescheduling unit ReS. The corresponding trajectories of FIG. 4a show as series of movements of the ASCs along the rails, interrupted by periods of time where the respective ASC remains at the same position while lifting up or letting down a container. The trajectories indicate that ASC 3a would start its movements at rail position zero, x=0, and ASC 3b starts from the middle of container yard 1 at rail position 240, x=240, given in meters. The first pickup position of ASC 3a is at position zero, while the first pick up position of ASC 3b is at 70. For ASC 3a, it will take some time until the respective container 8 is lifted, while the ASC 3b can directly start to move towards its first pick up position, being in an unloaded state. The first drop-off position of ASC 3a is at position 150. However, the trajectories show that when ASC 3a would start to move towards this drop-off position, it will be blocked half-way by ASC3b which is lifting its container at position 70. Accordingly, ASC 3a has to wait until the lifting is finished. Then, ASC 3a and ASC 3b can move simultaneously towards their drop-off positions at 150 and 200, respectively. Afterwards, ASC 3a will be executing its two further work orders alone, while ASC 3b remains idle and still.

From FIG. 4, it can be understood that the work orders generated and scheduled by TOS 9 show some potential for improvement. The waiting time of ASC 3a during the lifting operation of ASC 3b costs valuable time. Further, the workload between the two cranes is imbalanced as ASC 3b does not get any work orders for a considerable period of time. Both reduce the overall crane efficiency.

In order to improve the crane efficiency, the data processing module of rescheduling unit ReS is arranged to split at least one of the work orders shown in FIG. 4a into at least two new work orders through introduction of at least one intermediate position between the start and end positions and to determine a sequence and an allocation to ASCs 3a and 3b for both the resulting new work orders and those original work orders which remain unsplit. The scheduling is performed by the data processing module so as to reduce either the number and/or the duration of situations, where the expected trajectory of one ASC blocks the expected trajectory of the other ASC, or the workload imbalance between the ASCs, or both.

Figure 4B:
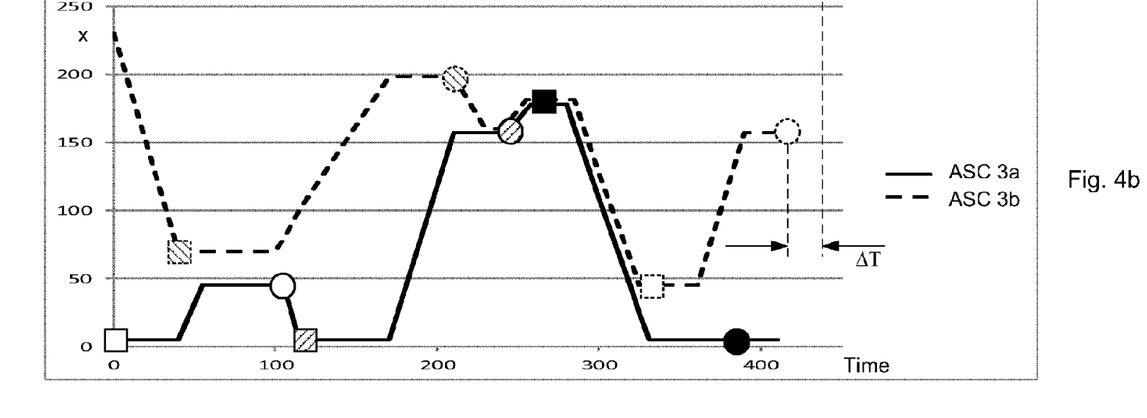

A possible result of the rescheduling performed on the work orders of FIG. 4a is shown in FIG. 4b. As can be seen, the first work order performed by ASC 3a is split, so that instead of simply waiting for ASC 3b, ASC 3a drops off the first container at position 45 and continues with its originally third work order, moving the corresponding target container from start position zero to end position 160. Afterwards, ASC 3a executes its originally second work order between start position 180 and end position zero, while ASC 3b has to yield for some time and may then take over the remaining second part of the first work order of ASC 3a, by picking up the container at position 45 and by moving it to its original end position 160. Altogether, the original four work orders of ASC 3a and ASC 3b together are now executed as one split work order resulting in two new work orders and as three remaining unsplit work orders. The time period needed for the work order execution is by the time difference ΔT shorter than the time period needed for the original four work orders.

Figure 5A:
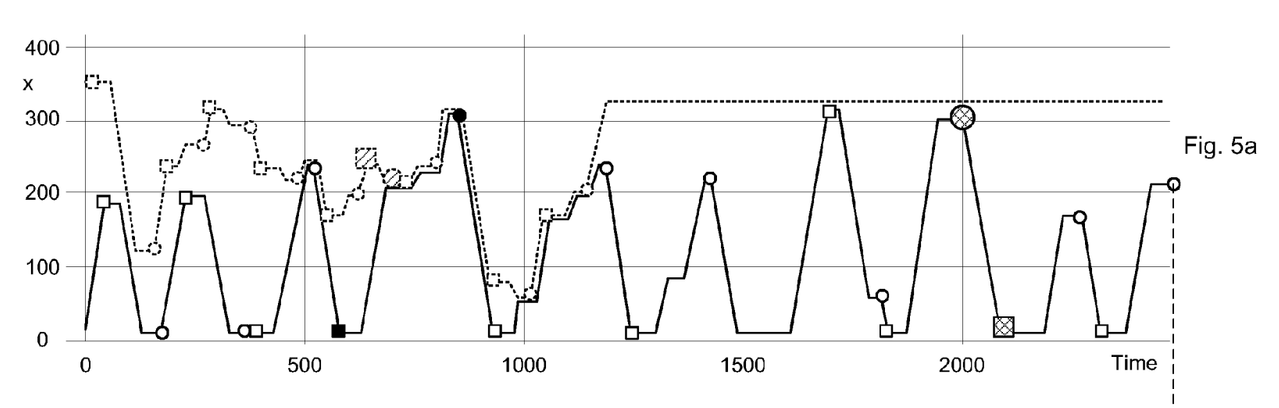
FIGS. 5a, 5b show further trajectories of scheduled and rescheduled work orders applying heuristics.
Figure 5B:
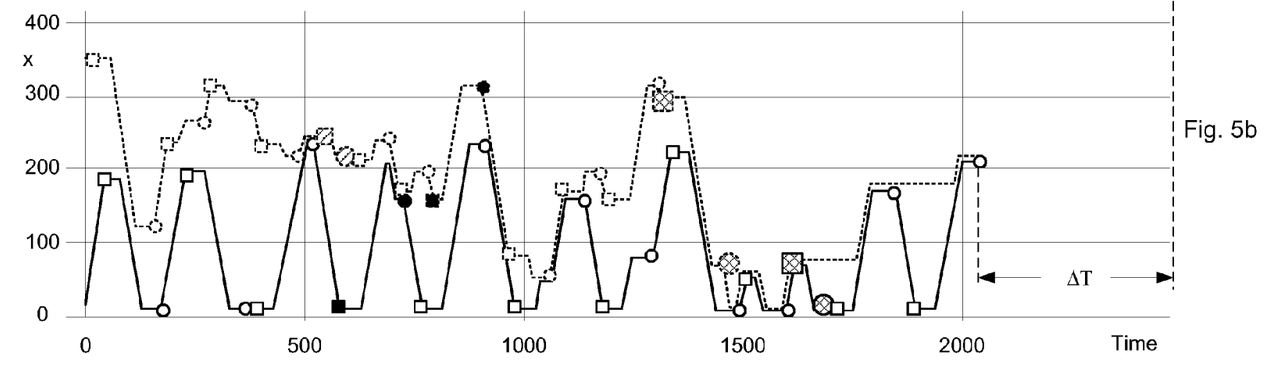
Figure 6A:
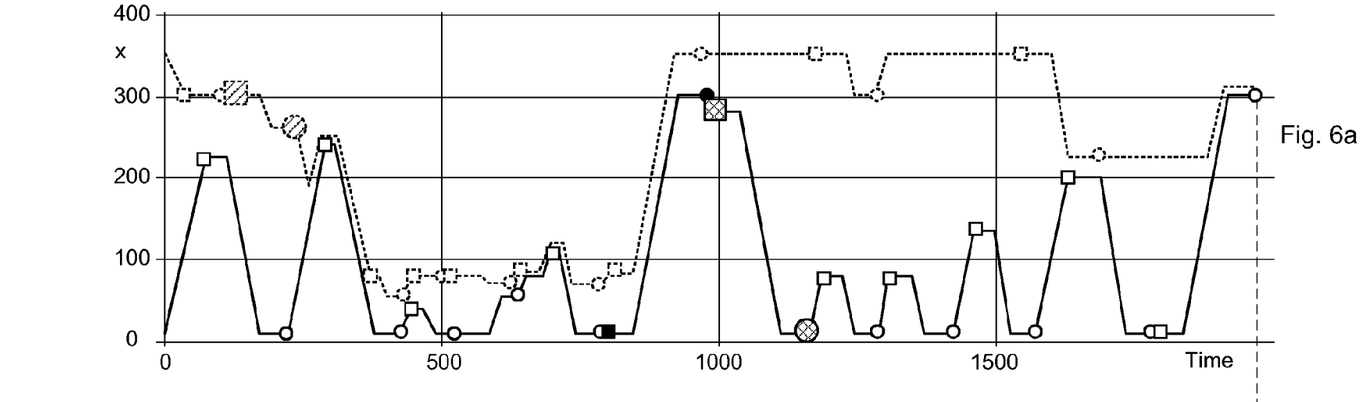
FIGS. 6a, 6b show trajectories of scheduled and rescheduled work orders applying a scheduling algorithm.
Figure 6B:
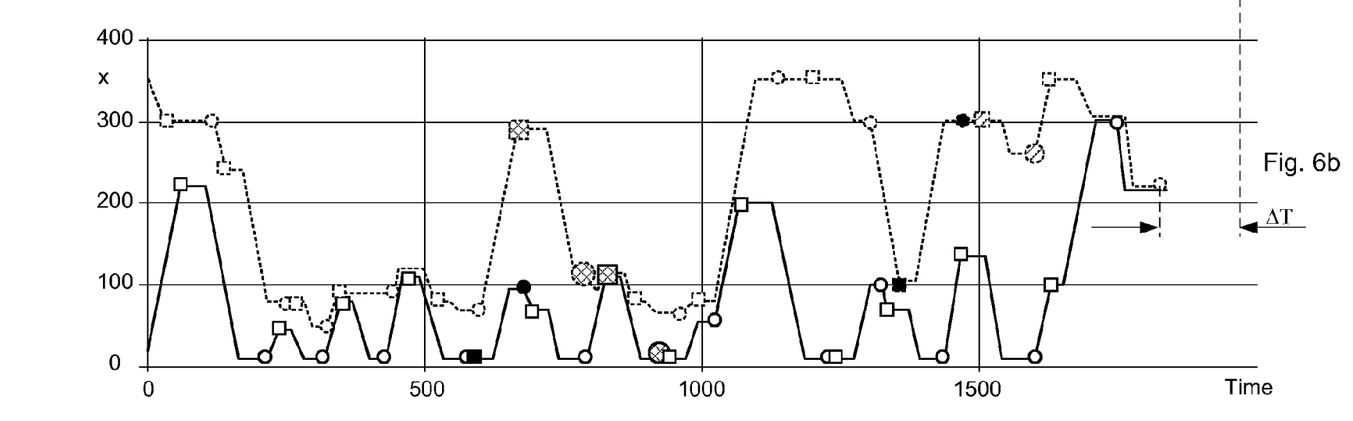

FIGS. 5a to 6b show the same kind of comparison between scheduled and rescheduled work orders. While FIGS. 4b and 5b present the results generated by a rescheduling unit applying heuristic rules, FIG. 6b illustrates the outcome of a scheduling algorithm with integrated optimization functionality. Both were described above.

When looking at FIG. 5a, it becomes apparent that ASC 3b is idle for a considerably period of time at the end again, and that ASC 3a needs to wait several times, for example between the points in time 700 to 800 and 1000 and 1200. In FIG. 6a, the idle times of ASC 3b are distributed over the whole length of time, which can be seen from the long waiting times of ASC 3b between drop-off and pickup operations.

The results of the rescheduling as shown in FIGS. 5b and 6b illustrate that the order of work orders per ASC was partly rearranged, as is indicated for example by the work orders with the striped symbols at the start and end positions. Further, some work orders were split, as are shown by the black symbols and the symbols with a checked pattern inside, were in these examples all split work orders are at the same time taken over by the respective other ASC. Of course, it is also possible that both parts of a split work order are performed by one and the same ASC. Even further, work orders may not only be rearranged per ASC but shifted completely from one ASC to the other.

Both, in FIGS. 5b and 6b, the time period for executing all work orders was successfully reduced again by a time period ΔT. FIG. 6b illustrates an additional feature of the rescheduling algorithm. ASC 3b finishes its final work order already at point in time 1450. Afterwards, it does not directly return to an idle position but seems to follow ASC 3a instead. The trajectory of ASC 3b is indeed planned like this on purpose in order to keep it close at hand in case new work orders arrive from TOS 9 which require a splitting of work orders currently executed by ASC 3a. In this way, unnecessary travelling times of an idle crane can be further reduced.

All the above described examples of a system and the methods performed by its components for controlling the two ASCs 3a and 3b can be extended to three and more ASCs working on the same pair of rails 4a, 4b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A system for controlling at least two automated rail mounted gantry cranes which cannot pass one another, the system comprising, for each of the cranes, a crane control unit including:
   a control input interface, configured to receive, from a scheduling system, at least one work order at a time, and configured to receive at least one sensor information reflecting execution of one of the work orders by the respective crane, wherein each work order specifies at least a start position and an end position of a target container to be moved by a respective crane;
   a control processing unit configured to process the at least one work order and the at least one sensor information to generate control information for ensuring execution of the at least one work order by the respective crane;
   a control output interface configured to transmit the control information towards at least one actuator of the respective crane; and
   a rescheduling unit including (i) an input interface configured to receive the at least one work order for all the cranes; (ii) a data processing module configured to perform a rescheduling by generating for each work order an expected trajectory along the rail between corresponding start and end positions, splitting at least one of the work orders into at least two new work orders through introduction of at least one intermediate position between the start and end positions, and determining a sequence and an allocation to the cranes for resulting new and unsplit work orders so as to reduce at least one of the (a) a number of situations, where an expected trajectory of one crane blocks the expected trajectory of another crane, (b) a duration of situations, where the expected trajectory of one crane blocks the expected trajectory of another crane, (c) a workload imbalance between the cranes; and (iii) an output interface configured to transmit new and unsplit work orders to the at least one control input interface of the crane control unit of the respective allocated crane,
   wherein the rescheduling unit operates in parallel with the crane control units executing the work orders, and
   wherein the control processing units regard the work orders received from the rescheduling unit as update of all previously received work orders.

2. The system of claim 1, wherein the data processing module determines the intermediate position so that it fulfills at least one of the
   empty position with shortest distance to the expected trajectory of the work order to be split,
   empty position with best accessibility from the expected trajectory of the work order to be split, and
   empty position which does not block any target container to be moved next.

3. The system of claim 1, wherein the data processing module further takes into account an earliest start time and/or a latest completion time of at least one of the work orders or of a subtask of at least one of the work orders.

4. The system of claim 1, wherein the data processing module performs the rescheduling iteratively.

5. The system of claim 1, wherein the rescheduling unit is integrated in one of the crane control units.

6. The system of claim 1, wherein the data processing module performs the rescheduling once for a newly received list of work orders or whenever receiving an external trigger.

7. The system of claim 1, wherein the data processing module takes into account during rescheduling at least one of the following additional information on ongoing and/or future work order execution:
current position of the target container of the respective work order;
current operational status of the crane assigned to the work order under rescheduling;
status of work order execution currently performed by the crane which is assigned to the work order under rescheduling;
timing of work order execution currently performed by the crane which is assigned to the work order under rescheduling; and
timing of execution of future work orders.

8. The system of claim 7, wherein the data processing module decides that a work order needs to be split when the length of interference time and/or the workload imbalance exceeds a corresponding predetermined threshold.

9. The system of claim 8, wherein the data processing module takes into account additional pickup and drop-off times resulting from each work order splitting.

10. The system of claim 8, wherein the data processing module combines objectives taking into account a priority and/or a weight predefined for at least one of the objectives to be combined, the objectives including at least one of (i) minimizing an overall execution time of the at least one work order, (ii) minimizing a travelling distance for the cranes which are in an unloaded state, (iii) minimizing a length of interference time between the cranes, (iv) minimizing a workload imbalance between the cranes, (v) minimizing a waiting time for other container handling equipment waiting for work order completion by the cranes, (vi) keeping a time difference between a latest completion time and an expected completion time of the at least one work order above zero, and (vii) minimizing an amount of energy used by the cranes.

11. The system of claim 1, wherein the data processing module determines from an expected trajectory a corresponding length of interference time during which the crane assigned to the corresponding work order has to yield and/or wait.

12. The system of claim 1, wherein the data processing module determines from an expected trajectory a workload imbalance between the cranes by calculating and comparing the number of work orders performed by each of the cranes during a predefined period of time and/or the length of idle time for each of the cranes during the predefined period of time.

13. The system of claim 1, wherein the data processing module performs the rescheduling by applying a scheduling algorithm which directly sequences and allocates the work orders to the at least two cranes taking the at least one work order for all the cranes as input, wherein the scheduling algorithm
allows for splitting of the at least one work order by employing preemption,
abides by at least one of the (i) no splitting of work orders the duration of which or the corresponding expected trajectory of which falls below a corresponding predefined threshold, (ii) no splitting of work orders which are above a predefined priority level, (iii) no violating of a predefined precedence of work orders, and (iv) no or minimum violating of a predefined earliest start time and/or a latest completion time of the at least one work order or of a subtask of the at least one of the work orders, and
optimizes a resulting sequence and allocation of the work orders according to at least one of the (i) minimizing an overall execution time of the at least one work order, (ii) minimizing a travelling distance for the cranes which are in an unloaded state, (iii) minimizing a length of interference time between the cranes, (iv) minimizing a workload imbalance between the cranes, (v) minimizing a waiting time for other container handling equipment waiting for work order completion by the cranes, (vi) keeping a time difference between a latest completion time and an expected completion time of the at least one work order above zero, and (vii) minimizing an amount of energy used by the cranes.

14. The system of claim 1, wherein the rescheduling unit reduces (a) the number of situations, where the expected trajectory of one crane blocks the expected trajectory of another crane.

15. The system of claim 14, wherein the rescheduling unit reduces (b) the duration of situations, where the expected trajectory of one crane blocks the expected trajectory of another crane.

16. The system of claim 14, wherein the rescheduling unit reduces (c) the workload imbalance between the cranes.

17. The system of claim 1, wherein the rescheduling unit reduces (b) the duration of situations, where the expected trajectory of one crane blocks the expected trajectory of another crane.

18. The system of claim 17, wherein the rescheduling unit reduces (c) the workload imbalance between the cranes.

19. The system of claim 1, wherein the rescheduling unit reduces (c) the workload imbalance between the cranes.

20. A method for controlling at least two automated rail mounted gantry cranes which cannot pass one another, the method comprising, for each of the cranes:
receiving, from a scheduling system, at least one work order at a time;
receiving at least one sensor information reflecting execution of one of the work orders by a respective crane, wherein each work order specifies at least a start position and an end position of a target container to be moved by the respective crane;
processing the at least one work order and the at least one sensor information to generate control information for ensuring execution of the at least one work order by the respective crane;
transmitting the control information towards at least one actuator (AA, AB) of the respective crane;
receiving the at least one work order for all the cranes; and
performing a rescheduling by (i) generating for each work order an expected trajectory along the rail between the corresponding start and end positions, (ii) splitting at least one of the work orders into at least two new work orders through introduction of at least one intermediate position between the start and end positions, and (iii)

determining a sequence and an allocation to the cranes for the resulting new and unsplit work orders so as to reduce at least one of:

a number of situations, where the expected trajectory of one crane blocks the expected trajectory of another crane, a duration of situations, where the expected trajectory of one crane blocks the expected trajectory of another crane, a workload imbalance between the cranes, and transmitting the new and unsplit work orders to a respective allocated crane, wherein the rescheduling is performed in parallel with the executing of the work orders, and wherein the work orders received from the rescheduling are regarded by the respective allocated crane as an update of all previously received work orders.

\* \* \* \* \*